(12) United States Patent
Parham et al.

(10) Patent No.: US 7,675,900 B1
(45) Date of Patent: *Mar. 9, 2010

(54) SYSTEM AND METHOD FOR INTERFACING BETWEEN SIGNALING PROTOCOLS

(75) Inventors: Eric Sean Parham, Austin, TX (US); Brian E. Williams, Plano, TX (US); Anthony John Paul Carew, Austin, TX (US); Robert Whitcher, Austin, TX (US)

(73) Assignee: GENBAND Inc., Plano, TX (US)

( * ) Notice: Subject to any disclaimer, the term of this patent is extended or adjusted under 35 U.S.C. 154(b) by 1242 days.

This patent is subject to a terminal disclaimer.

(21) Appl. No.: 09/685,274

(22) Filed: Oct. 9, 2000

(51) Int. Cl.
*H04L 12/66* (2006.01)

(52) U.S. Cl. .................................................. 370/352

(58) Field of Classification Search ............... 370/352, 370/353, 357, 360, 373, 384, 386, 395.5, 370/401, 422, 424, 464–467; 709/238, 246, 709/249
See application file for complete search history.

(56) References Cited

U.S. PATENT DOCUMENTS

| | | | |
|---|---|---|---|
| 4,381,427 A | 4/1983 | Cheal et al. | 179/2 DP |
| 4,493,092 A | 1/1985 | Adams | 375/36 |
| 4,504,942 A | 3/1985 | Aro et al. | 370/58 |
| 4,507,793 A | 3/1985 | Adams | 375/36 |
| 4,512,025 A | 4/1985 | Frankel et al. | 375/36 |
| 4,578,537 A | 3/1986 | Faggin et al. | 179/2 DP |
| 4,608,686 A | 8/1986 | Barsellotti | 370/69.1 |
| 4,627,046 A | 12/1986 | Bellamy | 370/58 |
| 4,740,963 A | 4/1988 | Eckley | 370/110.1 |
| 4,748,656 A | 5/1988 | Gibbs et al. | 379/93 |
| 4,757,497 A | 7/1988 | Beierle et al. | 370/89 |
| 4,843,606 A | 6/1989 | Bux et al. | 370/89 |
| 4,853,949 A | 8/1989 | Schorr et al. | 379/2 |
| 4,881,226 A | 11/1989 | Lechner et al. | 370/110.1 |
| 4,903,292 A | 2/1990 | Dillon | 379/93 |

(Continued)

FOREIGN PATENT DOCUMENTS

EP  0 841 831 A2  5/1998

(Continued)

OTHER PUBLICATIONS

DSL forum TR-036 (Aug. 28th, 2000), pp. 24-41.*

(Continued)

*Primary Examiner*—Dmitry H Levitan
(74) *Attorney, Agent, or Firm*—Jenkins, Wilson, Taylor & Hunt, P.A.

(57) ABSTRACT

A telecommunications network (10) includes a gateway (18) receiving signaling information in a media gateway and call session control format from a Class 5 softswitch (26). The gateway (18) converts the media gateway and call session control format to a broadband loop emulation service signaling protocol for transfer to integrated access devices (20) at a customer premises (22) through a broadband loop emulation services network (14). The gateway (18) also receives signal information in a broadband loop emulation service signaling protocol from the integrated access devices (20) through the broadband loop emulation services network (14). The gateway (18) converts the broadband loop emulation service signaling protocol to the media gateway and call session control format for transfer to the Class 5 softswitch (26). The Class 5 softswitch (26) places the media gateway and call session control format into a network signal format for transfer over a signaling network (24).

26 Claims, 2 Drawing Sheets

U.S. PATENT DOCUMENTS

| | | | | |
|---|---|---|---|---|
| 5,033,062 | A | 7/1991 | Morrow et al. | 375/7 |
| 5,034,948 | A | 7/1991 | Mizutani et al. | 370/79 |
| 5,127,003 | A | 6/1992 | Doll, Jr. et al. | 370/110.1 |
| 5,134,611 | A | 7/1992 | Steinka et al. | 370/79 |
| 5,142,568 | A | 8/1992 | Ogata et al. | 370/110.1 |
| 5,142,571 | A | 8/1992 | Suzuki et al. | 370/79 |
| 5,151,923 | A | 9/1992 | Fujiwara | 375/5 |
| 5,216,704 | A | 6/1993 | Williams et al. | 379/93 |
| 5,220,560 | A | 6/1993 | Ogasawara | 370/79 |
| 5,247,347 | A | 9/1993 | Litteral et al. | 358/85 |
| 5,267,300 | A | 11/1993 | Kao et al. | 379/93 |
| 5,305,312 | A | 4/1994 | Fornek et al. | 370/62 |
| 5,317,627 | A | 5/1994 | Richardson, Jr. et al. | 379/93 |
| 5,341,374 | A | 8/1994 | Lewen et al. | 370/85.4 |
| 5,349,640 | A | 9/1994 | Dunn et al. | 379/387 |
| 5,367,222 | A | 11/1994 | Otani | 370/84 |
| 5,410,343 | A | 4/1995 | Coddington et al. | 348/7 |
| 5,426,692 | A | 6/1995 | Fujise | 379/93 |
| 5,448,635 | A | 9/1995 | Biehl et al. | 379/399 |
| 5,473,675 | A | 12/1995 | Chapman et al. | 379/93 |
| 5,479,447 | A | 12/1995 | Chow et al. | 375/260 |
| 5,493,609 | A | 2/1996 | Winseck, Jr. et al. | 379/96 |
| 5,499,241 | A | 3/1996 | Thompson et al. | 370/73 |
| 5,604,737 | A | 2/1997 | Iwami et al. | 370/352 |
| 5,606,553 | A | 2/1997 | Christie et al. | 370/394 |
| 5,610,910 | A | 3/1997 | Focsaneanu et al. | 370/351 |
| 5,610,922 | A | 3/1997 | Balatoni | 370/468 |
| 5,617,423 | A | 4/1997 | Li et al. | 370/426 |
| 5,625,404 | A | 4/1997 | Grady et al. | 348/7 |
| 5,625,685 | A | 4/1997 | Allegranza et al. | 379/399 |
| 5,638,363 | A | 6/1997 | Gittins et al. | 370/358 |
| 5,661,785 | A | 8/1997 | Carpenter et al. | 379/93.15 |
| 5,668,857 | A | 9/1997 | McHale | 379/93.07 |
| 5,671,251 | A | 9/1997 | Blackwell et al. | 375/222 |
| 5,673,290 | A | 9/1997 | Cioffi | 375/260 |
| 5,675,575 | A | 10/1997 | Wall, Jr. et al. | 370/326 |
| 5,692,035 | A | 11/1997 | O'Mahony et al. | 379/93 |
| 5,719,870 | A | 2/1998 | Baker et al. | 370/463 |
| 5,737,333 | A | 4/1998 | Civaniar et al. | 370/352 |
| 5,771,236 | A | 6/1998 | Sansom et al. | 370/458 |
| 5,781,547 | A | 7/1998 | Wilson | 370/395 |
| 5,781,617 | A | 7/1998 | McHale et al. | 379/93.14 |
| 5,787,088 | A | 7/1998 | Dagdeviren et al. | 370/493 |
| 5,793,843 | A | 8/1998 | Morris | 379/59 |
| 5,828,666 | A | 10/1998 | Focsaneanu et al. | 370/389 |
| 5,838,682 | A | 11/1998 | Dekelbaum et al. | 370/401 |
| 5,841,840 | A | 11/1998 | Smith et al. | 379/93.01 |
| 5,848,150 | A | 12/1998 | Bingel | 379/399 |
| 5,862,134 | A | 1/1999 | Deng | 370/352 |
| 5,864,747 | A | 1/1999 | Clark et al. | 455/3.2 |
| 5,878,120 | A | 3/1999 | O'Mahony | 379/93.09 |
| 5,881,142 | A | 3/1999 | Frankel et al. | 379/167 |
| 5,883,941 | A | 3/1999 | Akers | 379/93.08 |
| 5,889,773 | A | 3/1999 | Stevenson, III | 370/352 |
| 5,889,774 | A | 3/1999 | Mirashrafi et al. | 370/352 |
| 5,889,856 | A | 3/1999 | O'Toole et al. | 379/399 |
| 5,896,377 | A | 4/1999 | Boot et al. | 370/352 |
| 5,898,761 | A | 4/1999 | McHale et al. | 379/93.01 |
| 5,901,205 | A | 5/1999 | Smith et al. | 379/93.01 |
| 5,905,781 | A | 5/1999 | McHale et al. | 379/93.14 |
| 5,907,548 | A | 5/1999 | Bernstein | 370/353 |
| 5,917,814 | A | 6/1999 | Balatoni | 370/352 |
| 5,936,952 | A | 8/1999 | Lecomte | 370/352 |
| 5,940,479 | A | 8/1999 | Guy et al. | 379/93.01 |
| 5,943,404 | A | 8/1999 | Sansom et al. | 379/93.06 |
| 5,949,763 | A | 9/1999 | Lund | 370/261 |
| 5,974,043 | A | 10/1999 | Solomon | 370/352 |
| 5,978,390 | A | 11/1999 | Balatoni | 370/540 |
| 5,982,767 | A | 11/1999 | McIntosh | 370/352 |
| 5,991,292 | A | 11/1999 | Focsaneanu et al. | 370/352 |
| 5,999,565 | A | 12/1999 | Locklear, Jr. et al. | 375/222 |
| 5,999,598 | A | 12/1999 | Henrick et al. | 379/93.07 |
| 6,075,784 | A | 6/2000 | Frankel et al. | 370/356 |
| 6,075,796 | A | 6/2000 | Katseff et al. | 370/466 |
| 6,078,580 | A | 6/2000 | Mandalia et al. | 370/352 |
| 6,081,517 | A | 6/2000 | Liu et al. | 370/352 |
| 6,101,182 | A | 8/2000 | Sistanizadeh et al. | 370/352 |
| 6,112,084 | A | 8/2000 | Sicher et al. | 455/426 |
| 6,118,780 | A | 9/2000 | Dunn et al. | 370/355 |
| 6,125,113 | A | 9/2000 | Farris et al. | 370/389 |
| 6,125,117 | A | 9/2000 | Martin et al. | 370/397 |
| 6,130,879 | A | 10/2000 | Liu | 370/230 |
| 6,130,883 | A | 10/2000 | Spear et al. | 370/328 |
| 6,134,235 | A | 10/2000 | Goldman et al. | 370/352 |
| 6,141,339 | A | 10/2000 | Kaplan et al. | 370/352 |
| 6,144,667 | A | 11/2000 | Doshi et al. | 370/401 |
| 6,144,670 | A | 11/2000 | Sponaugle et al. | 370/401 |
| 6,154,445 | A | 11/2000 | Farris et al. | 370/237 |
| 6,157,637 | A | 12/2000 | Galand et al. | 370/356 |
| 6,167,042 | A | 12/2000 | Garland et al. | 370/354 |
| 6,175,562 | B1 | 1/2001 | Cave | 370/352 |
| 6,175,854 | B1 | 1/2001 | Bretscher | 709/201 |
| 6,181,694 | B1 | 1/2001 | Pickett | 370/353 |
| 6,181,715 | B1 | 1/2001 | Phillips et al. | 370/493 |
| 6,201,806 | B1 | 3/2001 | Moffett | 370/356 |
| 6,208,639 | B1 | 3/2001 | Murai | 370/356 |
| 6,222,829 | B1 | 4/2001 | Karlsson et al. | 370/329 |
| 6,229,810 | B1 | 5/2001 | Gerszberg et al. | 370/401 |
| 6,236,653 | B1 | 5/2001 | Dalton et al. | 370/352 |
| 6,240,084 | B1 | 5/2001 | Oran et al. | 370/352 |
| 6,240,085 | B1 | 5/2001 | Iwami et al. | 370/352 |
| 6,243,377 | B1 | 6/2001 | Phillips et al. | 370/354 |
| 6,243,398 | B1 | 6/2001 | Kahane et al. | 370/522 |
| 6,259,708 | B1 | 7/2001 | Cheng et al. | 370/493 |
| 6,262,979 | B1 | 7/2001 | Anderson et al. | 370/267 |
| 6,278,707 | B1 * | 8/2001 | MacMillan et al. | 370/352 |
| 6,285,671 | B1 * | 9/2001 | Bossemeyer et al. | 370/352 |
| 6,335,936 | B1 * | 1/2002 | Bossemeyer et al. | 370/420 |
| 6,389,011 | B2 * | 5/2002 | Allen et al. | 370/356 |
| 6,490,273 | B1 * | 12/2002 | DeNap et al. | 370/352 |
| 6,490,451 | B1 * | 12/2002 | Denman et al. | 455/436 |
| 6,603,760 | B1 * | 8/2003 | Smyk | 370/352 |
| 6,775,269 | B1 * | 8/2004 | Kaczmarczyk et al. | 370/352 |
| 6,839,342 | B1 * | 1/2005 | Parham et al. | 370/352 |
| 6,950,441 | B1 * | 9/2005 | Kaczmarczyk et al. | 370/467 |

FOREIGN PATENT DOCUMENTS

| | | |
|---|---|---|
| GB | 2313979 A | 10/1997 |
| WO | WO 97/23078 | 6/1997 |
| WO | WO 97/37458 | 10/1997 |
| WO | WO 98/42104 | 9/1998 |
| WO | WO 99/49608 | 9/1999 |
| WO | WO 00/31933 | 6/2000 |
| WO | WO 00/35157 | 6/2000 |
| WO | WO 00/56050 | 9/2000 |
| WO | WO 00/69131 | 11/2000 |
| WO | WO 01/05130 A1 | 1/2001 |
| WO | WO 01/06720 A1 | 1/2001 |
| WO | WO 01/13593 A1 | 2/2001 |
| WO | WO 01/13618 A1 | 2/2001 |

OTHER PUBLICATIONS

Chou, Joey, "The migration of LES to the Next Generation Network based on H.248", ATM Forum, May 8-12, 2000, San Francisco, California; 23 pages.

L-P. Anquetil et al., "Media Gateway Control Protocol and Voice Over IP Gateways," *Alcatel Telecommunications Review*, 2nd Quarter 1999, XP-000830045, 7 pages, 1999.

Maher Hamdi et al., "Voice Service Interworking for PSTN and IP Networks," *IEEE Communications Magazine*, May 1999, 8 pages, May 1999.

International Search Report in International Application No. PCT/US 01/42600, dated Apr. 10, 2002, 7 pages, Apr. 4, 2002.

Gudapati, et al., "Local Telephone Service for Cable Subscribers Using Packet Switched Access," ISS. World Telecommunications Congress, pp. 325-329, Sep. 21, 1997.

L. Van Hauwermeiren, et al., "Offering Video Services over Twisted Pair Cables to the Residential Subscriber by Means of an ATM Based ADSL Transmission System," ISS Symposium, vol. 1, 5 pages, Apr. 1995.

T.C. Kwok, "Residential Broadband Architecture Over ADSL and G. Lite (G.992.2) PPP Over ATM," XP-000830885, IEEE Communication Magazine, 6 pages, May 1999.

Notification of Transmittal of the International Search Report or the Declaration, 6 pages, Feb. 5, 2001.

Notification of Transmittal of the International Search Report or the Declaration, 7 pages, Jun. 29, 2001.

Notification of Transmittal of the International Search Report or the Declaration, 6 pages, Oct. 19, 2001.

Unknown, "Gateway control protocol," ITU-T Telecommunication Standardization Sector of ITU, Series H: Audiovisual and Multimedia Systems, Infrastructure of audiovisual services—Communication procedures, ITU-T Recommendation H.248, 224 pages. Jun. 2000.

Unknown, "Packet-based multimedia communications systems," ITU-T Telecommunication Standardization Sector of ITU, Series H: Audiovisual and Multimedia Systems, Infrastructure of audiovisual services—Systems and terminal equipment for audiovisual services, ITU-T Recommendation H.323, 124 pages, Feb. 1998.

Unknown, "Voice and Telephony Over ATM—ATM Trunking using AAL1 for Narrowband Services, Version 1.0," The ATM Forum Technical Committee, AF-VTOA-0089.000, 64 pages, Jul. 1997.

Unknown, "Voice and Telephony Over ATM to the Desktop Specification," The ATM Forum Technical Committee, af-vtoa-0083.000, 43 pages, May 1997.

Unknown, "Call Signaling Protocols and Media Stream Packetization for Packet Based Multimedia Communications Systems," ITU-T Telecommunication Standardization Sector of ITU, Line Transmission of Non-Telephone Signals, ITU-T Recommendation H.225.0, Version 2, 141 pages, Mar. 25, 1997.

Unknown, "Visual telephone systems and equipment for local area networks which provide a non-guaranteed quality of service," ITU-T Telecommunication Standardization Sector of ITU, Series H: Audiovisual and Multimedia services—Systems and terminal equipment for audiovisual services, ITU-T Recommendation H.323, 79 pages, Nov. 1996.

Unknown, "Adaptation of H.320 visual telephone terminals to B-ISDN environments," ITU-T Telecommunication Standardization Sector of ITU, Series H: Transmission of Non-Telephone Signals, Infrastructure of audiovisual services—Systems and terminal equipment for audiovisual services, ITU-T Recommendation H.321, 20 pages, Mar. 1996.

J.M. Fossaceca, J.D. Sandoz, and P. Winterbottom, "The PathStar™ Access Server: Facilitating Carrier-Scale Packet Telephony," Bell Labs Technical Journal, 17 pages, Oct.-Dec. 1998.

F. Dawson, Contributing Editor, "Packet-Based Voice, Video Becoming Real Market, New software, codecs make integration of voice over data networks more feasible and affordable," http://www.zdnet.com/intweek/print/970303/inwk0006.html, 6 pages, c 1997 Aug. 7, 2001.

Unknown, "Telogy Networks' Voice over Packet White Paper," http://www.telogy.com/our_products/golden_gateway/VOPwhite.html, 14 pages. Aug. 7, 2001.

Unknown Author, "The Role of Voice-Data Integration in Transforming your Business to e-business," IBM Networking White Papers: Voice-Data Integration in e-business, http://www.networking.ibm.com/voice/voice-data.html, 23 pages. Aug. 7, 2001.

Unknown Author, Press Release, "VOCALTEC expands telephony gateway product line with new eight-line solution for corporate intranets and internet service providers," VocalTec—The First and the Best, http://www.vocaltec.com/html/news1996/press_11_25.html, 5 pages, Aug. 7, 2001.

Unknown Author, Press Release, "VOCALTEC introduces the internet phone telephony gateway linking traditional and internet telephone networks," VocalTec—The First and the Best, http://www.vocaltec.com/html/news1996/press_03_08.html, 3 pages, Aug. 7, 2001.

Unknown Author, Press Release, "VOCALTEC's telephony gateway software captures 1996 product of the year honors from Computer Telephony magazine," VocalTec—The First and the Best, http://www.vocaltec.com/html/news1996/press_12_18.html, 3 pages, Aug. 7, 2001.

V.C. Majeti, "A Network Management Model for ADSL-based Broadband Systems," ADSL Forum Network Management Group, Brussels, Belgium, ADSL-Forum 97-112, 4 pages, Sep. 15, 1997.

V.C. Majeti, "Network Management System (NMS) Operations for ADSL-based Broadband Systems," ADSL Forum Network Management Group, Brussels, Belgium, ADSL Forum 97-113, 4 pages, Sep. 15, 1997.

Unknown Author, "Network Migration Working Text," ADSL Forum WT-013, ADSLForum WT013, Draft D, 60 pages, Jul. 8, 1997.

Unknown Author, "Network Migration Working Text," ADSL Forum WT-013, ADSLForum WT013, Draft C, 55 pages, Apr. 18, 1997.

Unknown Author, "Network Migration Working Text," ADSL Forum WT-013, ADSLForum WT013, Draft B, 53 pages, Jan. 12, 1997.

Unknown Author, "Network Migration Working Text," ADSL Forum WT-00x, ADSLForum 96-116, 32 pages, Dec. 10, 1996.

Unknown Author, "A Discussion of Voice over Frame Delay," Voice over FR, http://www.frforum.com/4000/4017052699.html, 10 pages, Aug. 7, 2001.

M. Coronaro, B. Rossi, "Integrated Office Communication System," Office Communication System, Electrical Communication—vol. 60, No. 1, 1986.

Erskine, et al. "Rolling Out VoDSL Through Loop Emulation" http://www.commsdesign.com/printableArticle/?article ID=16504475, 4 pages, Mar. 21, 2002.

Wiseman, Ben "Standardize and Deliver" http://telephonyonline.com/ar/telecom_standardize_deliver/, Telephony, Dec. 4, 2000, 4 pages.

"TalkingNets to Implement telecom technologies' Flexible Softswitch Technology Within its Next-Generation Network", SUPERCOMM 2000, Jun. 6, 2000, 3 pages.

* cited by examiner

SYSTEM AND METHOD FOR INTERFACING BETWEEN SIGNALING PROTOCOLS

TECHNICAL FIELD OF THE INVENTION

The present invention relates in general to telecommunication signal processing and more particularly to a system and method for interfacing between signaling protocols.

BACKGROUND OF THE INVENTION

Conventional telecommunications systems implement broadband loop emulation services (BLES) with a variety of protocols including channel associated signaling (CAS). The BLES standard is tightly coupled to Class 5 switch protocols. However, telecommunications systems are moving toward providing Class 5 switch implementation on a workstation server with packet based distribution techniques. The workstation server implementation, also known as Class 5 softswitch, mixes broadband access with packet based information. In performing this mixing, there will be a requirement to convert the channel associated signaling or other protocol signaling to and from some sort of media gateway and call session control protocol. Currently, there is no technique to perform this function.

SUMMARY OF THE INVENTION

From the foregoing, it may be appreciated by those skilled in the art that a need has arisen for a technique to convert broadband loop emulation services signaling protocols to and from a media gateway and call session control protocol. In accordance with the present invention, a system and method for interfacing between signaling protocols are provided that substantially eliminate or greatly reduce disadvantages and problems associated with conventional telecommunications system operation.

According to an embodiment of the present invention, there is provided a system for interfacing between signaling protocols that includes a Class 5 softswitch operable to generate signaling information in a media gateway and call session control protocol. A gateway is operable to convert the media gateway and call session control protocol to a broadband loop emulation services signaling format.

The present invention provides various technical advantages over conventional telecommunications system operation. For example, one technical advantage is to provide conversion of media gateway and call session control signaling information to and from a broadband loop emulation services signaling format. Another technical advantage is to evolve the public switched telephone network to a packet based broadband distributed network. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
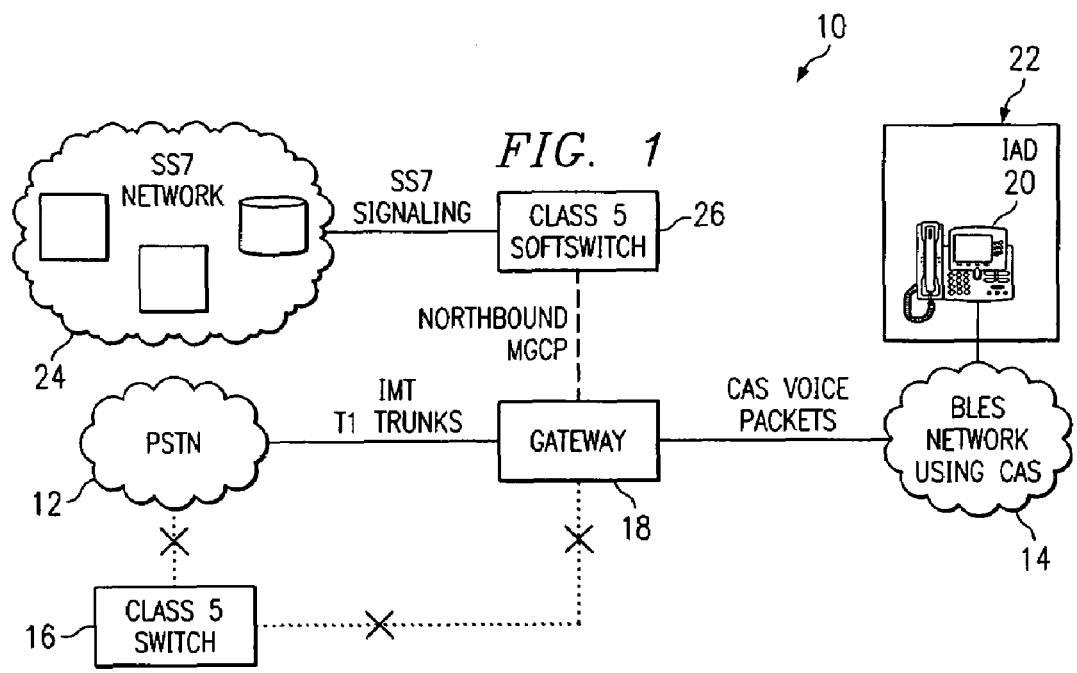
FIG. 1 illustrates a block diagram of a telecommunications network implementing a signaling interface technique.

FIG. 1 shows a block diagram of a telecommunications network 10 implementing a signaling interface technique. Telecommunications network 10 includes a public switched telephone network (PSTN) 12 and a broadband loop emulation service (BLES) network 14. Conventionally, PSTN 12 couples to BLES network 14 through a Class 5 switch 16 and a gateway 18 in order to provide communications to and from an integrated access device (IAD) 20 at a customer premises 22. Signaling information having one of various broadband loop emulation service signaling protocols, including a channel associated signaling format and a BLES common channel signaling format, is received at gateway 18 from Class 5 switch 16 for transfer to BLES network 14. Channel associated signaling is used to determine such information as ringing, off-hook, and on-hook for a normal plain old telephone service (POTS) telephone. Gateway 18 transfers pulse code modulated voice signals and the signaling information preferably over BLES network 14 using asynchronous transfer mode cells to an appropriate IAD 20.

According to the present invention, a signaling network 24 provides signaling information in a network signaling format to a Class 5 softswitch 26. The Class 5 softswitch 26 converts the network signaling format to a media gateway and call session control format. Class 5 softswitch 26 provides the call control, feature activation control, and call accounting intelligence for telecommunications network 10. In the broadband loop emulation services proxy network architecture of telecommunications network 10, Class 5 softswitch 26 is responsible for and has the authority to accept and control both incoming call requests from the network as well as outgoing call requests from customer premises 22. Class 5 softswitch 26 utilizes network signaling to and from the network and the media gateway and call session control format to and from gateway 18 to establish and teardown subscriber calls and invoke call features on existing calls. Gateway 18 receives the media gateway and call session control format from Class 5 softswitch 26 for processing in order to provide signaling information to the BLES network 14. Examples of media gateway and call session control protocols include Signaling Gateway Control Protocol (SGCP), Media Gateway Control Protocol (MGCP), H.248, H.323, and Session Initiation Protocol (SIP) signaling standards.

In operation, Class 5 softswitch 26 receives signaling information in a network signaling format from signaling network 24. Signaling network 24 is shown using an SS7 network signaling format example but may be configured to use any of a variety of signaling protocols to include international signaling configurations such as the C7 signaling protocol and other signaling protocols such as SIP, Session Initiation Protocol for Telephones (SIP-T), Bearer Independent Call Control (BICC), and Signaling Transport (SIGTRAN). Class 5 softswitch converts the signaling information received in the network signaling format from signaling network 24 to a media gateway and call session control format. The media gateway and call session control format may be any of a variety of such formats including those specified above. The media gateway and call session control format is provided to gateway 18 for conversion to the desired broadband loop emulation service signaling protocol and passed on to IAD 20 at customer premises 22 through BLES network 14.

In order for gateway 18 to support and perform the BLES proxy signaling function, gateway 18 includes additional capabilities over and above those needed for conventional BLES operation. These capabilities include dial tone generation, hook flash detection, frequency shift keying tone detection for caller identification generation, tone detection, digit collection, and call progress tones including re-order tones, busy tones, and fast busy tones. Class 5 softswitch 26, through the signaling information, instructs gateway 18 as to which of the capabilities gateway 18 is to perform.

For reverse operation, signaling information in the broadband loop emulation service signaling format is provided to gateway 18 by IAD 20 at customer premises 22 through BLES network 14. Gateway 18 converts the broadband loop emulation service signaling format to a media gateway and call session control format. Gateway 18 provides signaling information in the media gateway and call session control format to Class 5 softswitch 26. Class 5 softswitch converts the media gateway and call session control format to a network signaling format. Signaling information in the network signaling format is provided for transfer within signaling network 24 by Class 5 softswitch 26. The present invention may accommodate any type of signaling information as alluded to above.

Figure 2:
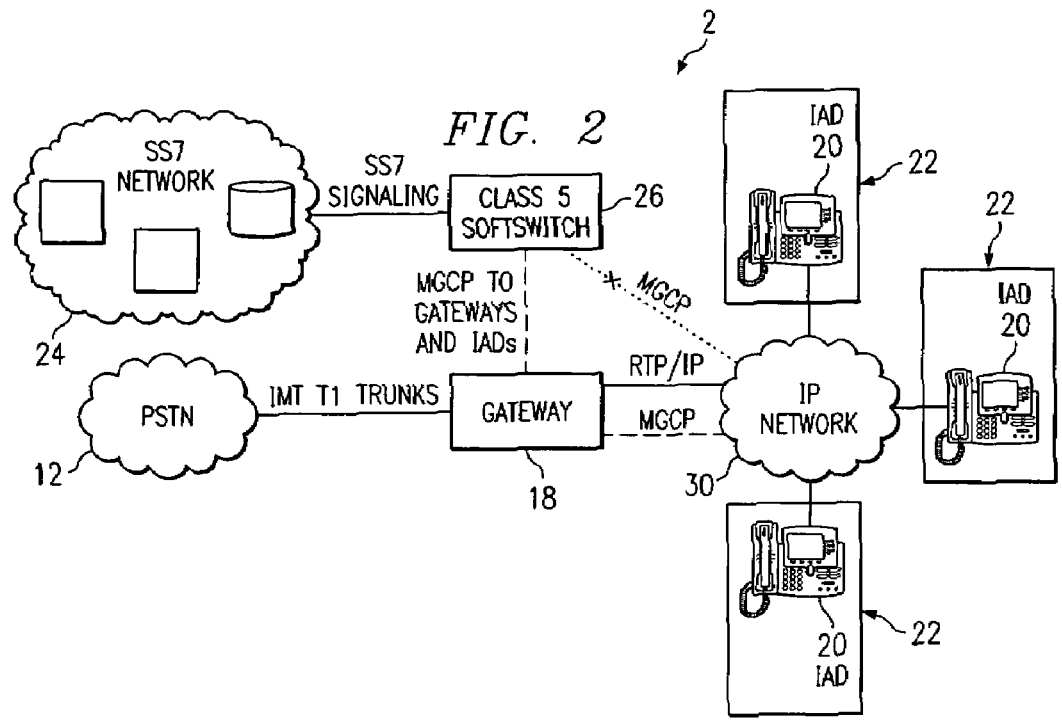
FIG. 2 illustrates a block diagram of a telecommunications network implementing a concentrator technique.

FIG. 2 shows a block diagram of a telecommunications network 2 implementing a concentrator technique separate and distinct from the signaling interface of FIG. 1. Telecommunications network 2 includes PSTN 12, signaling network 24, Class 5 softswitch 26, and gateway 18. Telecommunications network 2 also includes an Internet Protocol (IP) network 30 coupled to various IADs 20 at a plurality of customer premises 22. Gateway 18 receives pulse code modulated voice signals carried over T1 inter-machine trunks (IMT) from PSTN 12. Gateway 18 converts the voice signals to Realtime Transport Protocol (RTP) packets for transmission to appropriate IADs 20 over IP network 30. The IADs 20 receive the RTP packets and convert the information carried therein back to voice signals. Gateway 18 receives signaling information in the media gateway and call session control format from Class 5 softswitch 26. The signaling information assist gateway 18 by identifying which trunk provides the voice signals, which IAD 20 to communicate with, and to connect PSTN 12 to IP network 30. Class 5 softswitch 26 also provides signaling information to IADs 20 over IP network 30 to control individual telecommunications equipment coupled to IADs 20 at customer premises 22.

To eliminate a need for a signaling information link from Class 5 softswitch 26 to IADs 20, the signaling information for controlling individual pieces of telecommunications equipment coupled to IADs 20 may be processed through gateway 18. Gateway 18 provides management of signaling information between Class 5 softswitch 26 and IADs 20. Gateway 18 performs translation of the signaling information between Class 5 softswitch 26 and IADs 20. Gateway 18 will provide both the voice encoded RTP packets and the signaling information in the media gateway and call session control format to IADs 20. This technique eliminates the requirement of coupling Class 5 softswitch 26 to IP network 30. Class 5 softswitch 26 no longer needs to keep track of all IADs 20 being communicated with as this function is now offloaded to extended routing capabilities in gateway 18. The RTP packets and the signaling information are provided on separate logical paths from gateway 18 to IADs 20 and may or may not be provided on the same physical link therebetween. Thus, gateway 18 provides concentration of signaling information with voice encoded packets to destination IADs 20.

Gateway 18 also handles communications from IADs 20 to PSTN 12 and Class 5 softswitch 26. Gateway 18 may receive voice encoded RTP packets and signaling information in the media gateway and call session control format from IADs 20. Gateway 18 converts the RTP packets into voice signals for transfer to PSTN 12 over the inter-machine trunks. Gateway 18 also processes the signaling information for transfer to Class 5 softswitch 26 and ultimately to signaling network 24.

Figure 3:
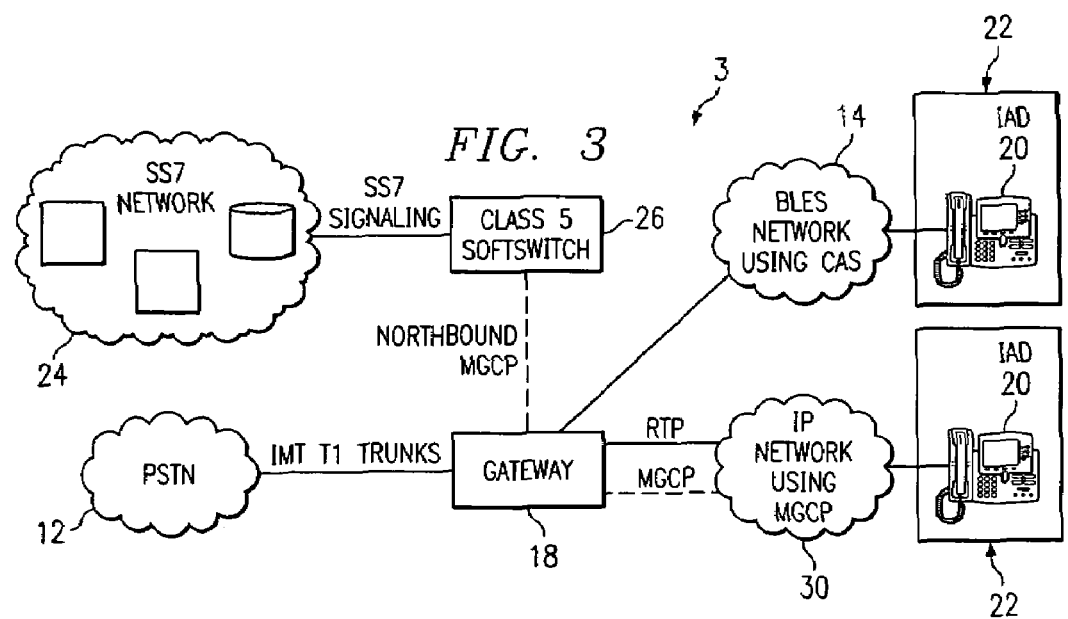
FIG. 3 illustrates a block diagram of a telecommunications network with both the signaling interface and concentrator techniques.

FIG. 3 shows a block diagram of a telecommunications network 3 incorporating both the signaling interface and concentrator techniques. Gateway 18 can also provide conversion of the broadband loop emulation service signaling protocol to the media gateway and call session control format for transfer of signaling information from Class 5 switch 16 or BLES network 14 to IP network 30. Gateway 18 may also provide the conversion of signaling information from Class 5 switch 16 or BLES network 14 for transfer to Class 5 softswitch 26. Gateway 18 further provides the concentration function discussed above.

The signaling interface and concentrator features provided by gateway 18 discussed above enable service providers to deploy a softswitch architecture together with standards based voice over digital subscriber lines (VoDSL) without requiring the change out of multiple generations of IADs 20. In the first stages of VoDSL deployment, the installed base of VoDSL IADs 20 primarily support asynchronous transfer mode (ATM) based broadband loop emulation services. In order to deploy VoDSL in a next generation softswitch architecture, IADs 20 must be able to support voice over internet protocol (VoIP), MGCP, Media Gateway Control (Megaco)/H.248, SIP, among other new telephone features. This would force service providers to do a complete change out of customer premises hardware, resulting in increased costs and disruption of services. Gateway 18 allows service providers to migrate their existing network to next generation packet technologies. Gateway 18 is able to offer service providers the flexibility to deploy VoDSL in a Class 5 derived architecture, a pure softswitch architecture, or a hybrid architecture regardless of the network topology or standards based protocol enabled in IAD 20.

In summary, gateway 18 offers for example integrated northbound and southbound MGCP, H.248/Megaco, and SIP in combination with the BLES proxy feature that is able to take for example AAL2 BLES from IAD 20 and translate it to MGCP, H.248, and SIP to enable a seamless interface with a softswitch architecture. Along with the concentrator feature, the BLES proxy feature allows service providers to deploy standards based VoDSL immediately without forcing a major upgrade of customer premises equipment to migrate the network for supporting a Class 5 replacement or advanced services provided by a softswitch. The present invention makes different types of customer premises equipment appear uniform to the switching core, enabling service providers to de-couple the core network switching evolution from the access equipment.

Thus, it is apparent that there has been provided, in accordance with the present invention, a system and method for interfacing between signaling protocols that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A system for interfacing between signaling protocols, comprising:

a gateway having a first interface for communicating with a Class 5 softswitch and that is operable to receive, from the Class 5 softswitch, signaling information in a media gateway and call session control format; and the gateway operable to convert the signaling information received from the Class 5 softswitch in the media gateway and call session control format to signaling information in a broadband loop emulation service (BLES) signaling protocol format, the gateway having a second interface for communicating the signaling information in the BLES protocol format over a BLES network, the gateway operable to provide services over the BLES network including dial tone generation, hook flash detection, caller identification generation, digit collection, call progress tones, and tone detection capabilities, wherein the Class 5 softswitch instructs the gateway as to which of the services to provide over the BLES network via the signaling information in the media gateway and call session control format, wherein the gateway provides the services over the BLES network as instructed by the Class 5 softswitch, and wherein the media gateway and call session control format is a format usable by a media gateway controller to control a media gateway.

2. The system of claim 1, wherein the gateway is operable to receive signaling information in the broadband loop emulation service signaling protocol, the gateway being operable to convert the broadband loop emulation service signaling protocol to the media gateway and call session control format.

3. The system of claim 2, wherein the gateway is operable to provide the signaling information in the media gateway and call session control format to the Class 5 softswitch.

4. The system of claim 1, wherein the media gateway and call session control format follows any of a SGCP, MGCP, H.248, SIP, and H.323 standard.

5. The system of claim 1, wherein the gateway is operable to receive voice signals from a public switched telephone network, the gateway is operable to place the voice signals into data packets for transfer to an Internet Protocol network with the signaling information to establish a call connection from a public switched telephone network user to an Internet Protocol network user and eliminate direct coupling of the Class 5 softswitch to the Internet protocol network.

6. The system of claim 5, wherein the data packets and the signaling information are transferred over a common physical link.

7. The system of claim 5, wherein data packets and the signaling information are transferred over separate logical links.

8. The system of claim 5, wherein the Internet Protocol network has no link to the Class 5 softswitch other than through the gateway.

9. The system of claim 1, wherein the Class 5 softswitch is operable to receive signaling information in a network signaling format, the Class 5 softswitch is operable to convert the network signaling format to the media gateway and call session control format, the Class 5 softswitch is operable to control incoming call requests from a network through the gateway according to the signaling information.

10. The system of claim 9, wherein the network signaling format is any of a SS7 and C7 signaling format.

11. The system of claim 9, wherein the gateway is operable to provide signaling information to the Class 5 softswitch in the media gateway and call session control format, the Class 5 softswitch operable to convert the media gateway and call session control format to the network signaling format.

12. The system of claim 1, wherein the broadband loop emulation services signaling protocol implements a channel associated signaling format.

13. The system of claim 1, wherein the broadband loop emulation services signaling protocol implements a common channel signaling standard.

14. A method for interfacing between signaling protocols, comprising:
at a gateway:
receiving signaling information in a media gateway and call session control format from a Class 5 softswitch;
converting the signaling information received from the Class 5 softswitch in the media gateway and call session control format to signaling information in a broadband loop emulation service signaling protocol format and providing the signaling information in the BLES signaling protocol format over a BLES network;
providing capabilities for services over the BLES network including dial tone generation, hook flash detection, caller identification generation, digit collection, call progress tones, and tone detection capabilities; and
determining which of the services the gateway is to perform in response to instructions received from the Class 5 softswitch through the signaling information in the media gateway and call session control format and providing the services over the BLES network as instructed by the Class 5 softswitch and wherein the media gateway and call session control format is a format usable by a media gateway controller to control a media gateway.

15. The method of claim 14, wherein the media gateway and call session control format follows any of a MGCP, SGCP, H.248, SIP, and H.323 standard.

16. The method of claim 14, further comprising:
receiving voice signals from a public switched telephone network;
placing the voice signals into data packets for transfer to an Internet Protocol network with the signaling information to establish a call connection from a public switched telephone network user to an Internet Protocol network user and eliminate direct coupling of the Class 5 softswitch to the Internet protocol network.

17. The method of claim 16, wherein the data packets and the signaling information are transferred over either a common physical link or separate logical links.

18. The method of claim 14, further comprising:
providing the broadband loop emulation service signaling protocol to an integrated access device at a customer premises.

19. The method of claim 14, wherein the broadband loop emulation services signaling protocol implements a channel associated signaling format.

20. The method of claim 14, wherein the broadband loop emulation services signaling protocol implements a common channel signaling standard.

21. A computer readable medium having stored thereon executable instructions that when executed by a processor of a computer control the computer to perform steps comprising:
at a gateway:
receiving signaling information in a media gateway and call session control format from a Class 5 softswitch;
converting the signaling information received from the Class 5 softswitch in the media gateway and call session control format to signaling information in a broadband loop emulation service BLES signaling protocol format;

providing the signaling information in the BLES signaling protocol format over a BLES network;

providing capabilities for services over the BLES network including dial tone generation, hook flash detection, caller identification generation, digit collection, call progress tones, and tone detection capabilities; and determining which of the services the gateway is to provide over the BLES network in response to instructions received from the Class 5 softswitch through the signaling information in the media and call session control format and providing the services over the BLES network as instructed by the Class 5 softswitch and wherein the media gateway and call session control format is a format usable by a media gateway controller to control a media gateway.

22. The computer readable medium of claim 21, comprising:

receiving signaling information in a network signaling format;

converting the network signaling format to the media gateway and call session control format;

controlling incoming call requests from a network through the gateway according to the signaling information.

23. The computer readable medium of claim 22, comprising:

providing signaling information to the Class 5 softswitch in the media gateway and call session control format; and converting the media gateway and call session control format to the network signaling format.

24. The computer readable medium of claim 23, wherein the data packets and the signaling information in the media gateway and call session control format are transferred over either a common physical link or separate logical links.

25. The computer readable medium of claim 21, wherein the media gateway and call session control format follows any of a MGCP, SGCP, H.248, SIP, and H.323 standard.

26. The computer readable medium of claim 21, comprising:

receiving voice signals from a public switched telephone network;

placing the voice signals into data packets for transfer to an Internet Protocol network with the signaling information to establish a call connection from a public switched telephone network user to an Internet Protocol network user and eliminate direct coupling of the Class 5 softswitch to the Internet protocol network.

* * * * *